July 15, 1941.                E. E. MOTT                2,249,160
                           ACOUSTIC DEVICE
                          Filed May 19, 1939
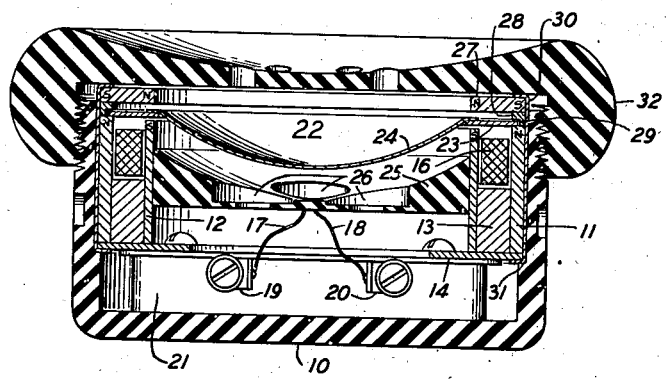
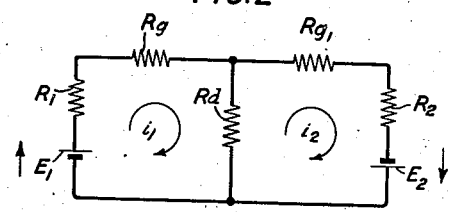
INVENTOR
E. E. MOTT
BY
Walter C. Kiesel
ATTORNEY Patented July 15, 1941

2,249,160

UNITED STATES PATENT OFFICE 2,249,160

ACOUSTIC DEVICE

Edward E. Mott, Upper Montclair, N. J., assignor to Bell Telephone Laboratories, Incorporated, New York, N. Y., a corporation of New York Application May 19, 1939, Serial No. 274,483

3 Claims. (Cl. 179—120)

This invention relates to acoustic devices and more particularly to telephone receivers of the ring armature type such as disclosed, for example, in Patent 2,170,571, granted August 22, 1939, to Edward E. Mott and Patent 2,171,733, granted September 15, 1939, to Albert L. Thuras.

Reference is made to a related invention disclosed in the application Serial No. 274,485, filed May 19, 1939, of Louis A. Morrison.

Ring armature type acoustic devices comprise, in general, a diaphragm including a central bodily vibratile portion and an outer or marginal magnetic or armature portion, and a magnetic structure including a magnet and a coil or coils, adapted to carry variable currents of speech and music frequencies, cooperatively associated with the magnetic or armature portion of the diaphragm. When the device is utilized as a receiver, the coil or coils vary the flux in the magnetic system, in accordance with the current passed through the coils. Conversely, when the device is operated as a transmitter, vibrations of the diaphragm produce variations in the flux linking the coil or coils to induce a current therein.

One of the recognized criteria for evaluating the efficiency of an acoustic device for translating energy of one kind into energy of another kind is the force factor of the device. In the case of receivers, the force factor may be defined as the ratio of the mechanical force produced to the magnitude of the current producing it. In the case of transmitters, the force factor is the ratio of the volts induced per unit of diaphragm or armature velocity. In a device, either a receiver or transmitter, having a wholly or partly magnetic diaphragm, the force factor may be expressed as $$G = n\frac{\delta\phi}{\delta\alpha} = nG_0$$

where $G$ is the force factor, $n$ is the number of turns in the coil or coils, and $$\frac{\delta\phi}{\delta\alpha}$$

or $G_0$ is the rate at which the total flux interlinking the diaphragm and the pole-pieces of the magnetic structure varies with the displacement of the diaphragm.

The force factor is an important element in determining the figure of merit of an acoustic device. For a receiver, the figure of merit may be expressed mathematically as directly proportional to $$\frac{AG_0}{M_0}$$

where $A$ is the effective diaphragm area and $M_0$ is the effective mass of the diaphragm.

For a transmitter, the figure of merit is directly proportional to $$\frac{AG_0}{\sqrt{M_0}}$$

One general object of this invention is to improve the translating efficiency of acoustic devices.

More specifically, objects of this invention are to obtain a high force factor and a high figure of merit for receivers and transmitters of the ring armature type.

In accordance with one feature of the invention, an additional magnetic means is provided in cooperative relation with the armature and magnet structure of an acoustic device to improve the translating efficiency thereof.

A further feature of the invention resides in the proportioning and orientation of the additional magnetic means with relation to the other magnetic elements of the device to obtain a high force factor therefor.

An additional feature of the invention involves the use of a radially magnetized permanent ring magnet as the additional magnetic means.

Other and further objects and features of the invention will appear from the following description of an illustrative embodiment thereof, taken in connection with the appended drawing in which:

Fig. 1 is a sectional view of a ring armature type receiver in which an illustrative form of the invention is embodied, and Fig. 2 is a diagram illustrating the magnetic circuit of the receiver shown in Fig. 1.

Referring to the drawing, 10 designates a casing of insulating material for housing the receiver element. The magnetic structure may comprise a pair of concentric cylindrical or ring pole-pieces 11 and 12 of magnetic material and a radially magnetized ring magnet 13. These parts may be conveniently assembled into a unit on a flat ring 14 of non-magnetic material, the parts being sweated together. Other suitable means of assembly may be employed if desired.

The pole-piece rings 11 and 12 may be of any suitable magnetic material such as permalloy. Permalloy may be defined as an alloy containing nickel to the extent of 30 per cent or more, the balance chiefly iron, and having the characteristic property of high initial permeability. The magnet 13 may be formed from a magnetic alloy such as one comprising iron 58 per cent, nickel 29 per cent and aluminum 13 per cent or iron 53 per cent, nickel 20 per cent, aluminum 10 percent, cobalt 12 per cent and copper 5 per cent.

A speech-current coil 16 may be mounted adjacent ring magnet 13 in the space between pole-pieces 11 and 12. The coil 16 may be of ring form to fit said space. Conductors 17 and 18 may be brought out from coil 16 to terminals 19 and 20 on terminal block 21. The terminal block may have means (not shown) for making exterior connections to a cord or the like.

The diaphragm 22, which is preferably of the composite type, may comprise a flat marginal ring armature portion 23 of magnetic material and a dome-shaped central portion 24 of non-magnetic material. Suitable materials for the armature portion are permalloy or an alloy comprising iron 49 per cent, cobalt 49 per cent and vanadium 2 per cent. The dome-shaped portion may be of very thin aluminum, aluminum alloy or the like. The two portions of the diaphragm are secured together by suitable means, such as cement.

By reference to the drawing it will be noted that inner pole-piece 12 is somewhat shorter axially than outer pole-piece 11 to provide for an air-gap between the diaphragm and the magnetic structure. The armature portion 23 of the diaphragm 22 has its outer portion resting on pole-piece 11 and its inner portion spaced from pole-piece 12. The armature ring is shown in unflexed condition in the drawing. In actual practice, the force due to magnet 13 holds this ring firmly against the face of pole-piece 11 and flexes it toward but out of contact with pole-piece 12.

Mounted under the dome-shaped portion 24 of the diaphragm and within pole-piece 12 is member 25 of non-magnetic material and preferably of electric insulation, having a plurality of openings 26 therein. The side of member 25 adjacent the diaphragm dome 24 may be curved to conform approximately to the diaphragm curvature. This member forms part of the acoustic circuit back of the diaphragm and may be located in the proper position relative thereto by cementing it to the pole-piece 12 or by other securing means.

A radially magnetized ring magnet 27 is mounted in front of the diaphragm and spaced therefrom by a ring 28 of brass or other non-magnetic material. Ring 28 has a flange portion 29 which rests on the face of pole-piece 11 and is slightly spaced from the outer edge of ring armature 23. There is a slight clearance between the face of armature 23 and the main body portion of spacing ring 28, so that no clamping force is exerted on the diaphragm. The spacing ring 28 prevents the armature 23 from adhering by magnetic attraction to magnet 27 in the event that it should become displaced from its seat on pole-piece 11. The clearance between the face of the armature 23 and spacing ring 28 is kept sufficiently small to avoid any possibility of the armature being held permanently against ring 28 by the force of magnet 27, if the aforementioned displacement from its seat occurs. The rings 27 and 28 may be attached to the main magnetic unit by a band 30 of metal, such as aluminum alloy, which may be crimped over rings 27 and 14. The receiver assembly may rest on a shoulder 31 in the casing 10, being held in place by a cap or cover 32.

A suitable material for magnet 27 is an alloy comprising iron 58 per cent, nickel 29 per cent and aluminum 13 per cent or iron 53 per cent, nickel 20 per cent, aluminum 10 per cent, cobalt 12 per cent and copper 5 per cent. It is desirable to space the magnet 27 from the ring armature 23 a distance of from five to ten times that at the main air-gap between the armature 23 and pole-piece 12.

The direction of magnetization in magnets 13 and 27 is such that the poles of the latter are opposite magnetically to the pole-piece adjacent each. For example, as indicated by letters N and S in the drawing, outer pole-piece 11 may be a north pole and the outer pole of magnet 27 a south pole, the corresponding inner pole-piece and poles then being south and north, respectively.

Other equivalent magnetic means for producing a unidirectional field of the proper shape may be used in place of ring magnets 13 and 27. The term unidirectional field as employed in this specification and the appended claims relates to a steady non-reversing field and has no reference to the spatial direction of the flux lines.

The effect of the additional magnet 27 is to reduce the flux density in the armature to approximately the point of maximum permeability relative to alternating flux, without reducing the flux density in the air-gap. Also, there may be a redistribution of the flux in the diaphragm so that there is a closer linkage with that in the pole-piece. It has been demonstrated that in a device as disclosed, the force factor may be increased by as much as a factor of from 2 to 3.

The relationships, from a magnetic standpoint, in a device constructed in accordance with this invention may be appreciated from the magnetic network illustrated in Fig. 2. In this network, $E_1$ is the magnetomotive force of the magnet structure 11, 12, 13, $E_2$ is the magnetomotive force of the magnet 27, $R_1$ is the reluctance of the magnet structure 11, 12, 13

$R_2$ is the reluctance of the magnet 27, $R_d$ is the reluctance of the armature 23, $R_g$ and $R_{g1}$ are the reluctance of the air-gap between pole-piece 12 and armature 23 and between magnet 27 and armature 23, respectively, and $i_1$ and $i_2$ are the fluxes resulting from the magnetomotive forces $E_1$ and $E_2$.

In such a circuit, the flux in the armature is dependent, of course, upon the relative values of $E_1$ and $E_2$. If $i_1$ and $i_2$ are equal so that there is substantially no direct current flux in the armature, a magnetic balance is obtained, for which state, as can be developed from Kirchoff's laws, $$\frac{E_1}{E_2} = \frac{R_1+R_g}{R_2+R_{g1}}$$

In practice it has been found desirable for purposes of stability that only a partial magnetic balance be extant. The magnet structure 11, 12, 13 and the magnet 27, therefore, preferably are magnetized so that a partial balance, for example up to the order of 50 per cent unbalance obtains.

Although the foregoing description is of a specific embodiment of the invention, it is to be understood as for illustrative purposes and not as limiting the scope of the invention as defined by the appended claims.

What is claimed is:

1. An acoustic device comprising an annular magnetic structure including means for producing a unidirectional magnetic field and a signal coil, a diaphragm having a ring armature portion, said portion being separated from said magnetic structure by an air gap, and means for reducing the flux density in said armature portion to a point of approximately maximum permeability relative to alternating flux without reducing the flux density in said air gap consisting of a magnet spaced from said armature portion and polarized to produce a second unidirectional magnetic field of materially less magnitude than and in opposition to said first magnetic field.

2. An acoustic device comprising a diaphragm having a marginal, annular armature portion, permanent magnet means on opposite sides of said armature and in magnetic opposition, said means having such relative magnetomotive forces that a magnetic unbalance up to the order of 50 per cent obtains, and a signal winding magnetically coupled to only one of said means.

3. An acoustic device comprising a diaphragm having a marginal, annular magnetic portion, and a magnetic system including said magnetic portion, said system including also a signal coil and permanent magnet means having annular poles in juxtaposition to one surface of said armature and a second permanent magnet means having annular poles in juxtaposition to the other surface of said armature, said first and second magnet means having their unlike poles in juxtaposition whereby the flux produced in said armature by one of said means is opposite in direction to the flux produced in said armature by the other and said magnet means having such relative magnetomotive forces that a magnetic unbalance of 50 per cent or less obtains.

EDWARD E. MOTT.